United States Patent

Bakker et al.

[11] Patent Number: 5,904,378
[45] Date of Patent: May 18, 1999

[54] FLEXIBLE JOINT

[75] Inventors: Ernst Antonius Bakker, The Hague; Anthony Fui Liang Liew, Amsterdam, both of Netherlands

[73] Assignee: Shell Oil Company, Houston, Tex.

[21] Appl. No.: 08/784,792

[22] Filed: Jan. 16, 1997

[51] Int. Cl.$^6$ ....................................................... F16L 9/14
[52] U.S. Cl. ........................................... 285/55; 285/300
[58] Field of Search ....................................... 285/300, 55

[56] References Cited

U.S. PATENT DOCUMENTS

| | | | |
|---|---|---|---|
| 2,183,596 | 12/1939 | Trinks | 285/300 X |
| 3,460,856 | 8/1969 | Vantine et al. | 285/300 X |
| 3,766,868 | 10/1973 | Mahr . | |
| 4,023,832 | 5/1977 | Legille et al. . | |
| 4,685,703 | 8/1987 | Brock | 285/300 X |
| 5,346,263 | 9/1994 | Huzenlaub et al. . | |
| 5,480,194 | 1/1996 | Mantoon et al. | 285/300 X |

FOREIGN PATENT DOCUMENTS 1101879 3/1961 Germany .............................. 285/300

*Primary Examiner*—Dave W. Arola

[57] ABSTRACT

A flexible joint is disclosed which comprises a first rigid wall portion, a second rigid wall portion, a flexible wall portion extending between the first and second rigid wall portions, the three wall portions defining a longitudinal passage through the joint and being arranged along the length of the passage, a sleeve secured at one end to the first rigid wall portion and extending through the passage so as to overlap the second rigid wall portion, the sleeve being spaced from the flexible wall portion and free to move relative to the second rigid wall portion. In a preferred embodiment, a layer of insulating material is provided on a surface of the sleeve while leaving the space between the sleeve and the flexible wall portion to be occupied by process fluid when in use. In another embodiment, the length of the portion of the sleeve overlapping the second rigid wall portion is at least five times the distance of the sleeve from the second rigid wall portion, as measured perpendicular to the sleeve.

3 Claims, 3 Drawing Sheets

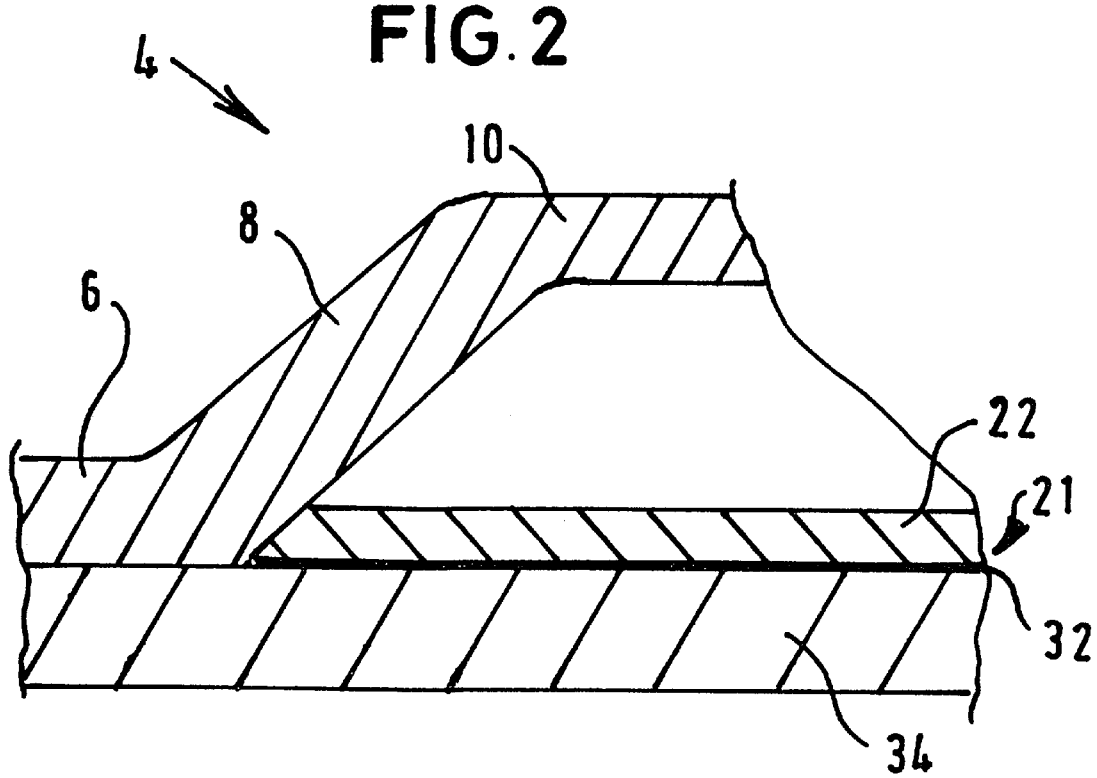
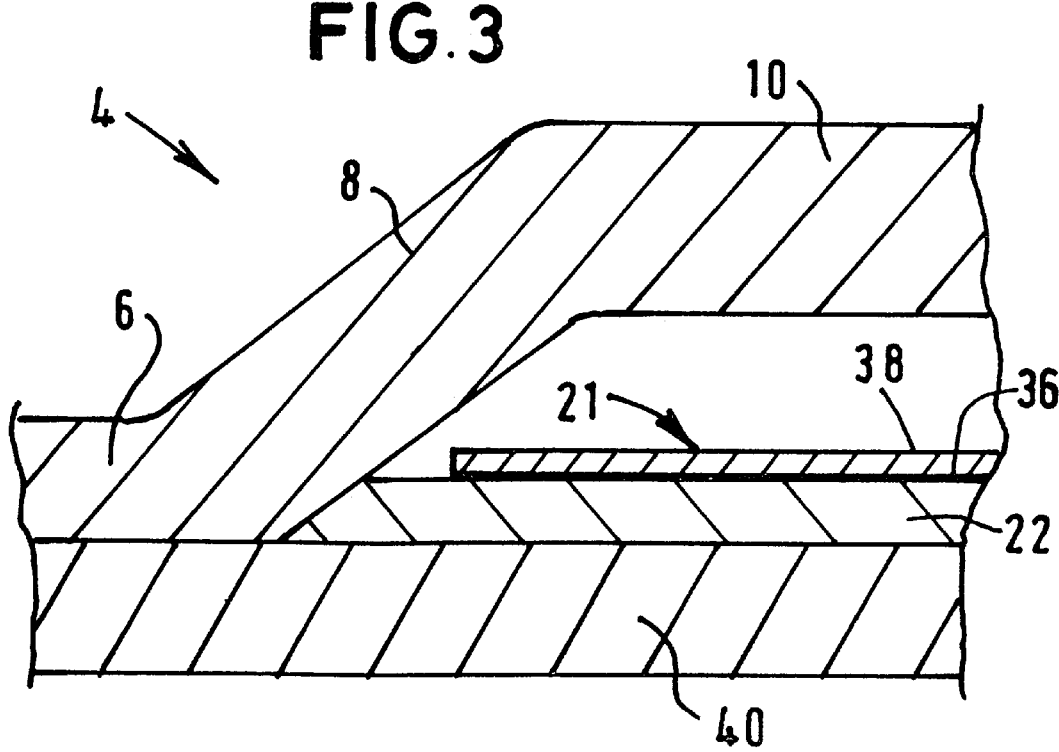

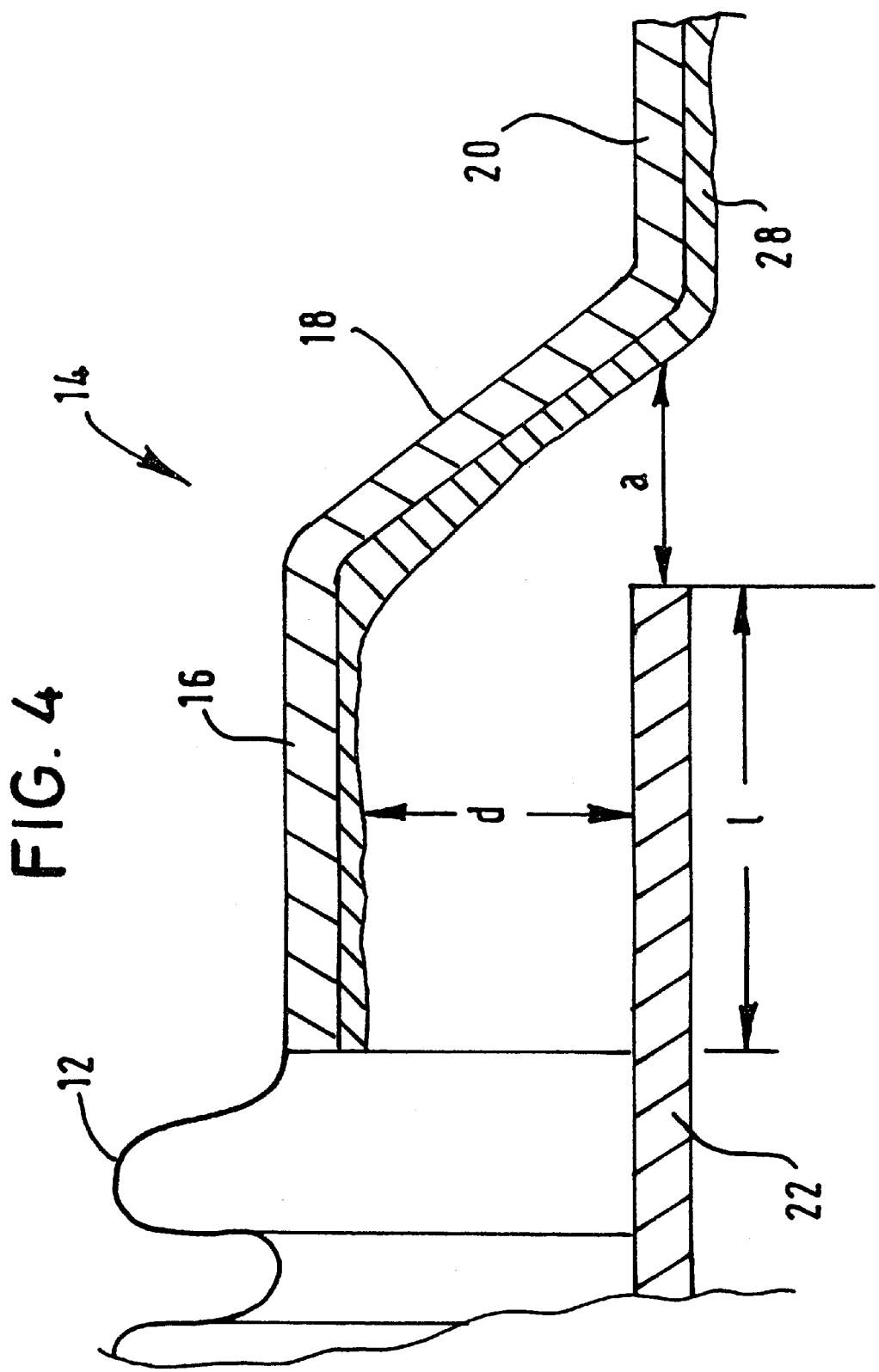

FLEXIBLE JOINT

FIELD OF THE INVENTION

The present invention relates to a flexible joint for use in conduits and vessels through which a fluid flows. In particular, the present invention relates to a flexible joint for use under aggressive conditions, such as high temperatures and the handling of fluids of a corrosive or abrasive nature.

The need for flexible joints in conduits and vessels arises frequently in the design and construction of chemical process plants. In many circumstances, conventional vessel and pipe constructions are too rigid for the prevailing process operating conditions and operation of such a rigid construction would result in unacceptably rapid deterioration and failure of the process equipment. Accordingly, there is a need for a flexible joint which may be incorporated in the wall of a vessel or pipe which combines the necessary degree of flexibility with the required integrity to withstand the process operating conditions. Designs of flexible joints have been available for many years. Reference is made to Chemical Engineers' Handbook, Fifth Edition, Edited by R. H. Perry and C. H. Chilton at page 6-48 for a general discussion of flexible joints for use in piping constructions. A typical flexible joint for use in a vessel, pipe or the like comprises a first and second rigid wall portion connected by a flexible wall portion. The three wall portions define a longitudinal passage through which a process fluid can flow and are arranged along the length of the passage.

The flexible wall portion is typically in the form of an undulant wall, often referred to in the art as "bellows".

More recently, as chemical processes advance, it has been found necessary to provide flexible joints which are able to withstand ever harsher environments, such as exposure to fluids at high temperatures, corrosive fluids and abrasive fluids. One example of a particularly harsh process environment may be found in the fluid catalytic cracking of hydrocarbons, in which it is necessary to contain and transport fluids containing hydrocarbon vapors and entrained catalyst particles at high temperatures. Typical process operating temperatures are of the order of 550° C. in the reaction stage and 750° C. in the regeneration stage. It will be readily appreciated that such high operating temperatures and the presence of an abrasive component, such as the cracking catalyst give rise to a very aggressive environment for the flexible portion of the flexible joint.

DESCRIPTION OF THE INVENTION

In order to prevent premature failure of the flexible portion of the joint, it has been found necessary to construct the joint from suitably resistant materials, for example alloys of steel, and protect the flexible portion from direct exposure to the process fluid. Accordingly, a variety of designs of flexible joints have been proposed for use in such harsh environments. A first design incorporates a protective sleeve disposed between the flexible portion of the joint and the process fluid, thereby preventing the process fluid from directly contacting the flexible portion. The protective sleeve is fixed at one end to the first rigid wall portion. The second end portion of the sleeve extends into the region defined by the second rigid wall portion and overlaps the second rigid wall portion, but is left free to allow for relative movement between the rigid wall portions. The sleeve is spaced from the flexible portion so as to form a cavity between the sleeve and the flexible portion. The cavity is open to the interior of the joint at the free end of the sleeve and, in operation, is filled with process fluid. This provides, in use, a degree of thermal insulation of the flexible portion from the high temperature of the flowing process. This design has the advantage of being simple to construct, install and maintain. However, the design does not always provide adequate insulation of the flexible portion from the high temperatures prevailing in many processes, such as the fluid catalytic cracking process mentioned above.

In a modification of this first design, one or more layers of insulating material are provided on the surface of the sleeve in contact with the process fluid and in the cavity between the sleeve and the flexible portion of the joint. A further modification is to provide a seal, typically a braided hose, between the free end of the sleeve and the second rigid wall portion in order to retain such insulating material in place. The seal also serves to limit the ingress of process fluid and debris into the cavity. These modifications provide improved thermal insulation for the flexible portion of the joint. However, they are more complicated to construct and are more difficult to maintain. In addition, it has been found that the seals deteriorate due to corrosion, embrittlement and/or relative movement between the sleeve and the second rigid wall portion, leading to an eventual failure of the seal. Debris from the seal may then be carried by the process fluid into other parts of the plant, causing blockages and damage to plant equipment. Designs have been proposed which comprise external insulation and electrical heating elements as a means of regulating the temperature of the flexible portion of the joint. These designs also suffer the disadvantage of being complicated to construct and maintain.

Accordingly, there is a need for a flexible joint which combines both simplicity of construction and ease of maintenance, while at the same time providing the necessary protection for the flexible portion of the joint against the high process fluid temperature being handled. In particular, there is a need for a flexible joint which allows the precise degree of insulation of the flexible wall portion to be controlled. This is important in such applications as the fluid catalytic cracking process mentioned above, where the flexible wall portion must be maintained at a temperature significantly below the temperature of the process fluid, while being at a temperature above the dew point of the hydrocarbon vapors being handled. Too high a level of insulation will result in the temperature of the flexible wall portion falling below the dew point of the process fluid, causing condensation to occur on the inside of the flexible joint. This may in turn lead to corrosion and premature failure of the flexible wall portion.

According to a first aspect of the present invention there is provided a flexible joint comprising a first rigid wall portion, a second rigid wall portion, a flexible wall portion extending between the first an second rigid wall portions, the three wall portions defining a longitudinal passage through the joint and being arranged along the length of the passage, a sleeve secured at one end to the first rigid wall portion and extending through the passage so as to overlap the second rigid wall portion, the sleeve being spaced from the flexible wall portion and free to move relative to the second rigid wall portion, wherein a layer of insulating material is provided on a surface of the sleeve while leaving the space between the sleeve and the flexible wall portion substantially free to be occupied by process fluid when in use.

Surprisingly, it has been found that careful selection and arrangement of the insulating material, together with the provision of a space between the sleeve and the flexible wall portion, allows the desired level of temperature reduction to be achieved. The flexible joint of the present invention also obviates the need for seals to be provided between the sleeve and the second rigid wall portion, thus simplifying the construction and maintenance of the flexible joint. Inspection of the joint during a plant shutdown is also facilitated by the space between the sleeve and the flexible wall portion being left substantially empty.

The flexible joint may be incorporated in the wall of a vessel or, more typically, in a conduit or pipeline. In cross-section, the wall portions of the flexible joint may have any suitable shape, adapted to match the cross section of the vessel or conduit into which the joint is to be installed. Most typically, the rigid wall portions will be cylindrical in cross-section. The rigid wall portions are typically constructed from the same material as the adjacent apparatus. Typical materials include mild steel, stainless steel and other steel alloys, with the selection depending upon the prevailing process conditions and the fluid being handled.

The flexible wall portion is disposed between the first and second rigid wall portions and is intended to absorb relative movement between the two rigid wall portions. Such movement typically arises, for example, due to vibration and pressure and temperature differentials which occur in the process equipment. The flexible wall portion may be of any suitable form. Most typically, the flexible wall portion is in the form of an undulant in longitudinal section, more commonly referred to as "concertina" or "bellows". The size and form of the undulations are selected according to the degree of flexibility and displacement required. Techniques for the selection and design of the flexible wall portions are well known in the art. The flexible wall portion may be constructed from any suitable material, including those mentioned hereinbefore in connection with the construction of the rigid wall portions. The flexible wall portion, being generally thin, may be susceptible to higher levels of stress corrosion and embrittlement cracking than the rigid wall portions. Accordingly, more resistant, and hence expensive, materials may need to be selected for the flexible wall portion. It is, however, an advantage of the present invention that more commonly available materials can be employed, for example Inconel and Incoloy alloys. The flexible wall portion may be attached to the two rigid wall portions by any suitable means known in the art.

The sleeve extends along the passage within the flexible joint. At one end, the sleeve is secured to the first rigid wall portion. Any suitable securing means may be employed. Welding is a most suitable means for securing the sleeve to the first rigid wall portion. The sleeve extends within the passage so as to overlap the second rigid wall portion. The sleeve is spaced from the flexible wall portion. The remaining end of the sleeve is not secured, thereby allowing the sleeve to move relative to the second rigid wall portion. Typically, the end portion of the sleeve overlapping the second rigid wall portion will be spaced from the second rigid wall portion.

In a preferred arrangement, the sleeve extends from the first rigid wall portion in a manner providing a continuous wall surface, thereby presenting little or no obstacle to the flow of fluid through the flexible joint, that is, the sleeve and a portion of each of the first and second rigid wall portions combine to form a substantially smooth sided passage for the flow of-fluid through the joint. The required spacing of the sleeve from the flexible wall portion is accommodated by having the width of the passage defined by the flexible wall portion greater than that of the nominal width of the flexible joint, that is the width of the smooth sided passage formed by the sleeve and a portion of each of the first and second rigid wall portions. An alternative, less preferred arrangement comprises a sleeve which extends into the passage, thereby creating a constriction in the fluid flowpath along the joint.

The sleeve may be formed from any suitable material which offers the required resistance to the process operating conditions. Typically, the sleeve will be of the same material as the first and second rigid wall portions.

It is the intention that, in operation, process fluid is allowed to occupy the space between the sleeve and the flexible wall portion. Process fluid may enter this space between the free end of the sleeve and the second rigid wall portion. The process fluid in said space is relatively still and acts as an insulating medium for the flexible wall portion. In order to allow the process fluid in said space to remain still, it is preferred that the first rigid wall portion is at the upstream end of the flexible joint, when installed and in use.

The insulating material is provided on a surface of the sleeve. The material may be attached to the surface of the sleeve in direct contact with the process fluid to be handled. Preferably, the insulating material is attached to the surface of the sleeve facing the flexible wall portion. Insulating material may be applied to both surfaces, if desired. The insulating material may consist of one layer of material or may comprise a plurality of layers. If a plurality of layers is employed, the layers may be of the same or different material. The selection of the number and position of the layers and the type of insulating material will depend upon the process operating conditions to be experienced by the flexible joint, the material from which the flexible wall portion is constructed and the nature of the process fluid being handled. The insulating material should have a low thermal conductivity at high operating temperatures, thereby allowing a relatively thin layer of the material to provide the required level of insulation. The material should preferably have as low an ash, sulphur and chloride content as possible. The material should be suitable for use under the prevailing process conditions, for example, conditions of high temperature. The insulating material is preferably a fibrous ceramic material. Suitable ceramic materials are fibers of silica, alumina, zirconia, magnesia, calcia and mixtures thereof. Suitable materials are available commercially, for example under the trade names SAFFIL and ZIRCAR. Alternative, less preferred materials for use as the insulating material include graphite and ash paper. Again, such materials are available commercially.

The layer of insulating material preferably covers substantially all of the surface of the sleeve onto which it is mounted, thereby avoiding the formation of hot zones which in turn reduce the effectiveness of the insulation. The layer of insulating material may be secured to the sleeve by any suitable means known in the art.

In a preferred embodiment of the present invention, the layer of insulating material is covered by a protective sleeve. The sleeve preferably covers substantially all of the insulating material, such that a sandwich of sleeves and insulating material is formed. In a further embodiment, the protective sleeve is not secured to the layer of insulating material, thereby allowing the protective sleeve to move relative to the insulating material. This allows for relative movement between the components arising, for example, from the effects of differential thermal expansion.

Where appropriate, the flexible joint is provided with a layer of erosion-resistant refractory oxide covering the surface of the sleeve adjacent the process fluid when the joint is in use. Suitable refractory materials are available commercially and are well known in the art. Suitable materials include silica, alumina, titania, zirconia, calcia, magnesia and mixtures thereof.

One suitable material comprises a mixture of alumina and silica and is available under the trade name CURAS 90 PF. The refractory oxide is typically applied in the form of a cement or in tiles or blocks. The layer of refractory oxide is relatively thick, compared with that of the layer of insulation material. The refractory oxide is porous, allowing some access of the process fluid to the underlying surface. A primary purpose of the refractory oxide is to provide protection against the abrasion and erosion of the underlying surface. If desired, the layer of refractory oxide may be applied over a layer of insulating material covering the surface of the sleeve. If no refractory oxide layer is provided, it is most preferred that the surface of the sleeve to be contacted directly by the process fluid is left bare and that the layer of insulating material is applied to the surface of the sleeve facing the flexible wall portion.

In a preferred embodiment of the present invention a layer of insulating material is provided on the surface of the second rigid wall portion. The layer of insulating material, if present, should cover at least that portion of the surface of the second rigid wall portion overlapped by the sleeve. More preferably, the layer of insulating material extends over substantially more of the surface of the second rigid wall portion.

Any of the materials discussed above for use as the layer of insulating material on the sleeve may be employed. Again, one or more layers may be used, the layers being comprised of the same or different material. In addition, it may be preferred to cover the layer of insulating material with a layer of refractory oxide, as discussed hereinbefore with respect to the refractory oxide applied to the surface of the sleeve.

As mentioned hereinbefore, the sleeve is spaced from the flexible wall portion, forming a space into which process fluid is allowed to flow during operation. The process fluid in the space forms a reservoir of relatively still fluid which acts to further insulate the flexible wall portion. For the proper operation of this reservoir of fluid as an insulator, it is important that it remains relatively still. It has now been found that the design of the free end portion of the sleeve and its relationship with the second rigid wall portion plays an important role in the insulating properties of the process fluid in said space, in particular the extent by which the sleeve overlaps the second rigid wall portion.

According to a second aspect of the present invention, there is provided a flexible joint comprising a first rigid wall portion, a second rigid wall portion, a flexible wall portion extending between the first and second rigid wall portions, the three wall portions defining a longitudinal passage through the joint and being arranged along the length of the passage, a sleeve secured at one end to the first rigid wall portion and extending through the passage so as to overlap the second rigid wall portion, the sleeve being spaced from the flexible wall portion and free to move relative to the second rigid wall portion leaving the space between the sleeve and the flexible wall portion substantially free to be occupied by process fluid when in use, wherein the length of the portion of the sleeve overlapping the second rigid wall portion is at least five times the distance of the sleeve from the second rigid wall portion, as measured perpendicular to the sleeve.

Preferably, the length of the portion of the sleeve overlapping the second rigid wall portion is at least 100 mm, more preferably at least 200 mm, under any condition.

It will be readily understood that the clearance between the free end of the sleeve and the second rigid wall portion must be sufficient to accommodate any relative movement between the two components when the joint is in use. In a preferred embodiment, the sleeve and a portion of both the first and second rigid wall portions combine to form a substantially smooth sided passage for the flow of fluid through the joint. In such cases, it is preferred that the distance of the free end of the sleeve from the second rigid wall portion, as measured along a line parallel to the longitudinal axis of the sleeve, is at least 10 mm, more preferably 25 mm under any condition.

A most preferred flexible joint comprises the first and second aspects of the present invention.

The flexible joint of the present invention may be applied in any application requiring a flexible joint. As mentioned hereinbefore, the joint is particularly suited to use in the handling of fluids under aggressive conditions, that is in handling fluids of a corrosive nature and/or fluids under conditions of high temperature. The use of refractory oxide materials also provides the joint with a high level of resistance to abrasive and erosive fluids. The joint may be applied in all manner of chemical and refining plants. As mentioned hereinabove, the joint is of particular use in processes employing fluidized solid media, such as the fluid catalytic cracking of hydrocarbons and the like. Other specific applications include the handling of gases at high temperatures, for example the handling of hot flue gases.

BRIEF DESCRIPTION OF THE DRAWINGS

The present invention will be further described having reference to the accompanying drawings, in which:

FIG. 2 is a diagrammatic representation of a portion of the sleeve of a flexible joint according to a second embodiment of the first aspect of the present invention;

FIG. 3 is a diagrammatic representation of a portion of the sleeve of a flexible joint according to a third embodiment of the first aspect of the present invention; and FIG. 4 is a diagrammatic representation of a portion of a flexible joint according to the second aspect of the present invention.

DETAILED DESCRIPTION OF THE DRAWINGS

Figure 1:
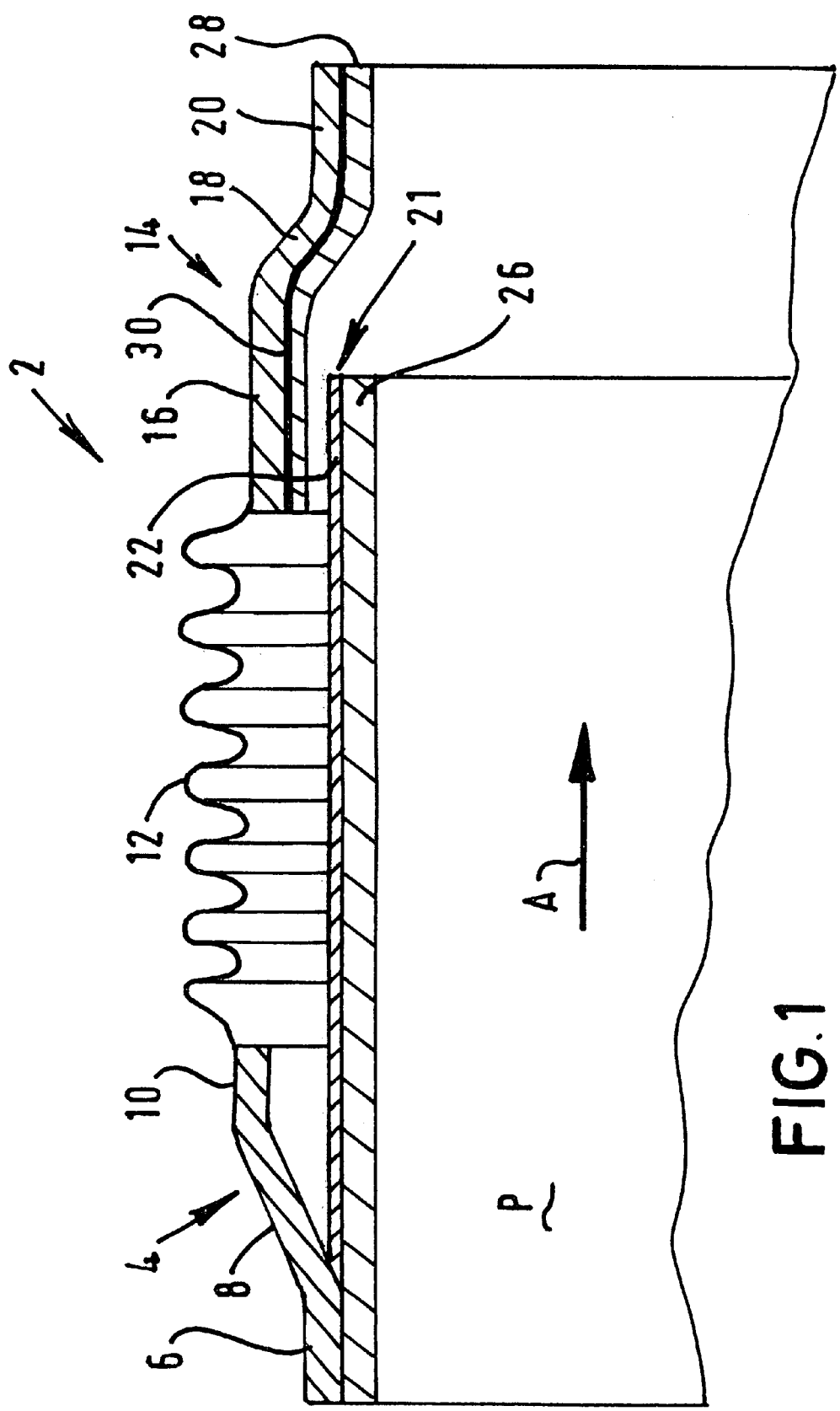
FIG. 1 is a diagramatic representation of a section through one half of a flexible joint according to a first embodiment of the first aspect of the present invention.

Referring to FIG. 1, a generally cylindrical flexible joint for use in a process pipeline, generally identified as 2, comprises a first rigid wall portion 4 having a narrow cylindrical outer end portion 6 and a wide cylindrical inner end portion 10 connected by a central frustoconical wall portion 8. A generally cylindrical flexible wall portion 12 extends from the inner end of the first rigid wall portion 4 to a second rigid wall portion 14, having inner, central and outer wall portions (16, 18, 20 respectively) to: the first rigid wall portion 4, but in the opposite orientation. The first, flexible and second wall portions 4, 12, 14 respectively are symmetrically arranged about a single longitudinal axis.

The flexible wall portion 12 has an undulant form in cross-section commonly applied in the art and often referred to as "bellows".

A cylindrical sleeve 22 is disposed co-axially within the wall portions 4, 12, 14 and is secured at one end to the first rigid wall portion 4 in the region of the junction of the outer end portion 6 and the central portion 8 by welds (not shown). The sleeve 22 extends past the flexible wall portion 12 and overlaps the inner end portion of the second rigid wall portion. A layer of insulating material 24, for example a ceramic fibre felt, is disposed on the outer surface of the sleeve 22, so as to lie between the sleeve 22 and the flexible wall portion 12. A layer of refractory oxide 26 is disposed on the inner surface of the sleeve 22. A layer of insulating material 28, for example a ceramic fibre felt, is disposed on the inner surface of the second rigid wall portion 14. A layer of refractory oxide 30 is disposed over the layer of insulating material 28.

It is to be understood that conventional fittings to flexible joints, such as the expansion limiting rods, leak detection system, weather shrouding and the gas purge connection have been omitted for the sake of clarity.

In use, the flexible joint 2 of FIG. 1 is arranged so that process fluid flows in a direction from the first rigid wall portion 4 to the second rigid wall portion 14, 30 as indicated by the arrow. Process fluid enters the space remaining between the sleeve 22 and the flexible wall portion 12 through the annulus between the sleeve 22 and the inner end portion 16 of the second rigid wall portion 14.

Referring to FIG. 2, there is shown an enlarged view of the sleeve 22 and the insulating material 32 disposed thereon in the region adjacent the first rigid wall portion 4. In the embodiment of FIG. 2, the sleeve 22 has a layer of insulating material 32 disposed on its inner surface. A layer of refractory oxide 34 extends over the layer of insulating material 32.

Referring to FIG. 3, showing a similar view to FIG. 2 of an alternative, particularly preferred embodiment, the sleeve 22 has a layer of insulating material 36 disposed on its surface facing the flexible wall portion 12. A cylindrical protective sleeve 38 extends over the layer of insulating material 36. A layer of refractory oxide 40 is disposed on the inner surface of the sleeve 22. The layer of insulating material 36 and the protective sleeve 38 should preferably extend as close as possible to the first rigid wall portion 4, while still allowing sufficient space to accommodate any relative movement between the various components. Space will be required, for example, in the case in which the protective sleeve 38 is not rigidly secured to the layer of insulating material 36.

Typically, for the embodiments shown in FIGS. 1, 2 and 3 to be adapted for application in a pipeline in the fluid catalytic cracking process referred to above, the sleeve 22 has a thickness of the order of 10 mm. The layer of insulating material or multiple layers thereof, if employed, has a total thickness of the order of 3 to 10 mm. The layer of refractory oxide has a thickness of the order of 25 mm. The protective cover, if present, has a thickness of the order of 3 to 6 mm. It will be readily understood that the thickness of the various components will be determined by the application in question.

FIG. 4 shows a detail (not to scale) of a flexible joint according to the second aspect of the present invention. Identical components to those described above with reference to FIG. 1 have the same reference numeral in FIG. 4. Thus, in FIG. 4, the sleeve 22 extends so as to overlap the inner end portion 16 of the second rigid wall portion 14. A layer of insulating material 24 extends over the outer surface of the sleeve 22. The distance "d" in FIG. 4 is the distance between the surface of the sleeve assembly (in this case the surface of the insulating layer 24) and the inside surface of the inner end portion 16, measured perpendicular to the longitudinal axis of the sleeve 22. The overlap of the sleeve 22 within the second rigid wall portion, represented by the distance l in FIG. 4, is at least five times the distance "d". Preferably, l is at least 200 mm. The distance "a" measured from the end of the sleeve 22 to the second rigid wall portion 14 along a line parallel to the longitudinal axis of the sleeve 22, is at least 25 mm.

EXAMPLE

The present invention will be further described by way of the following illustrative example.

The operating temperature of the flexible wall portion of a flexible joint according to the present invention can be calculated. A flexible joint was considered having the general structure shown in FIG. 1, but employing the arrangement of layers of insulating material, 36 protective sleeve 38 and layer of refractory oxide 40 shown in FIG. 3. The joint was considered as being installed in the catalyst stand-pipe of the regenerator of a conventional fluid catalytic cracking plant. The process fluid being handled was assumed to comprise hydrocarbon gases and entrained catalyst. As a worst case scenario, the space between the sleeve and the flexible wall portion was assumed to be filled with gas, with no catalyst being present. The flexible joint was assumed to have a geometry at the free end of the sleeve in accordance with the requirements of the second aspect of the present invention, as shown in FIG. 4. Details of the construction of the joint, the operating temperature and the resulting temperature of the flexible wall portion of the joint are shown in the Table below.

For comparison purposes, a similar calculation was conducted for a flexible joint of identical structure, but with the omission of the insulating materials. The details and results of this experiment are also set out in the Table.

TABLE

|  | Example | Comparative Example |
|---|---|---|
| Sleeve Thickness (mm) | 3 | 10 |
| Ceramic Fibre Insulating Layer Thickness (mm) | 3 | None |
| Protective Sleeve Thickness (mm) | 3 | None |
| Weather Enclosure | Yes | Yes |
| Maximum Process Temperature (° C.) | 750 | 750 |
| Maximum Temperature of Flexible Wall Portion (° C.) | 324 | 497 |

From the data in the Table, it can clearly be seen that the flexible joint constructed according to the present invention would result in a significantly lower temperature being experienced by the flexible wall portion of the joint. This in turn would lead to prolonged life of the joint and the opportunity to employ more commonly available, and hence more economical, materials of construction.

What is claimed is:

1. A flexible joint for a pipe or vessel comprising a first rigid wall portion, a second rigid wall portion, a flexible wall portion extending between said first and said second rigid wall portions, said three wall portions being tubular and being rigidly and sealably joined at their mating circumferences thereby defining a longitudinal passage through said joint and being arranged along the length of said passage, a sleeve located within said passage and having a surface rigidly and circumferentially secured at one end to said first rigid wall portion and extending through said passage so as to overlap said second rigid wall portion, said sleeve being spaced a distance from said flexible wall portion and said second wall portion and thereby free to move relative to said flexible wall portion and said second rigid wall portion;

wherein a layer of insulating material is disposed on the outer surface of said sleeve facing said flexible wall portion;

wherein said layer of insulating material is covered by a protective sleeve; and wherein a layer of refractory oxide is disposed on the surface of said sleeve.

2. The flexible joint according to claim 1, wherein said refractory oxide is selected from the group consisting of silica, alumina, titania, zirconia, calcia, magnesia and mixtures thereof.

3. A flexible joint for a pipe or vessel comprising a first rigid wall portion, a flexible wall portion extending between said first and said second rigid wall portions, said three wall portions being tubular and being rigidly and sealably joined at their mating circumference thereby defining a longitudinal passage through said joint and being arranged along the length of said passage, a sleeve located within said passage and having a surface rigidly and circumferentially secured at one end to said first wall portion and extending through said passage so as to overlap said second rigid wall portion, said sleeve being spaced a distance from said flexible wall portion and said second wall portion and thereby free to move relative to said flexible wall portion and said second rigid wall portion;

wherein a layer of insulating material is disposed on the surface of said second rigid wall portion; and wherein said layer of insulating material is in contact with a layer of refractory oxide.

* * * * *